United States Patent Office 3,022,335
Patented Feb. 20, 1962

3,022,335
SURFACE ACTIVE POLYOXYALKYLENE COMPOUNDS HAVING A PLURALITY OF HETERIC POLYOXYPROPYLENE - POLYOXYETHYLENE CHAINS
Lester G. Lundsted, Grosse Ile, Mich., assignor to Wyandotte Chemicals Corporation, Wyandotte, Mich., a corporation of Michigan
No Drawing. Filed Dec. 23, 1957, Ser. No. 704,282
10 Claims. (Cl. 260—485)

This invention relates to surface active polyoxyalkylene compounds having a plurality of heteric polyoxypropylene-polyoxyethylene chains. In a more specific aspect, this invention relates to new nonionic surface active agents and a method for preparing same where the new surfactants are mixtures of conjugated or "block" polymers of propylene oxide and ethylene.

This application is a continuation-in-part of my copending application Serial No. 498,085, filed March 30, 1955, now abandoned.

Nonionic surface active agents composed of a water-insoluble or hydrophobic nucleus, such as a long hydrocarbon chain or an alkyl-substituted ring compound, e.g. nonylphenol, and a water-solubilizing polyoxyethylene chain are well known in the art. Such surface active agents have excellent properties for many uses, but a disadvantage in this class of materials lies in the inflexibility of the water-insoluble or hydrophobic portion of the molecule. Any alteration in properties attributable to the hydrophobic portion of the surfactant can only be accomplished by selecting a completely different water-insoluble compound with which to condense ethylene oxide. Frequently however, different uses of surfactants require varying surfactant properties which differ only in small increments for the best performance.

An important contribution to the art in this regard is represented by the disclosure of U.S. 2,674,619, issued on April 6, 1954. U.S. 2,674,619 disclosed new surfactant compositions which are exemplified by the mixtures obtained by sequentially condensing propylene oxide with a lower molecular weight reactive hydrogen compound, such as propylene glycol, to produce a water-insoluble, hydrophobic polyoxypropylene polyol, and then condensing ethylene oxide with the polyoxypropylene polyol in an amount sufficient to solubilize the polyoxypropylene polyol and provide surface active properties. With the benefit of the disclosure of U.S. 2,674,619, the art can obtain surface active agents with properties which can be widely varied since both the hydrophobic and hydrophilic portions of the molecule can be altered by simply controlling the amounts of propylene oxide and ethylene oxide used in preparing the compounds. The compositions disclosed by U.S. 2,674,619 have opened the door for applications of nonionic surfactants derived from alkylene oxides in uncounted ways because of the new flexibility in chemical and physical properties that has been afforded.

Room for further improvement still exists, however. Even with the flexibility of chemical and physical properties afforded by the compositions of U.S. 2,674,619 wherein propylene oxide is initially condensed with a low molecular weight reactive hydrogen compound, and ethylene oxide in a solubilizing amount is then condensed therewith, we have found that specific combinations of properties desirable in a surfactant could not be attained in the compositions of U.S. 2,674,619. Keeping in mind the extremely wide variety of uses of nonionic surface active agents, it can well be appreciated that new uses are encountered with increasing frequency wherein new combinations of properties are required. Particularly in the field of formulated detergent compositions, new combinations of such important properties as detergency, cloud point and foaming (or non-foaming) are desired which are not obtainable in any specific composition of U.S. 2,674,619.

An object of this invention, therefore, is to provide new surface active polyoxyalkylene compounds having new combinations of chemical and physical properties. A further object is to provide a method for preparing surface active polyoxyalkylene compounds based on propylene oxide and ethylene oxide which have new and different combinations of chemical and physical properties.

As was stated above, the surface active agents disclosed by U.S. 2,674,619 are prepared by initially condensing propylene oxide with a low molecular weight reactive hydrogen compound, such as propylene glycol, so as to produce a hydrophobic polyoxypropylene polyol, and then condensing ethylene oxide with the hydrophobic polyoxypropylene polyol. I have discovered, however, that a completely new and different series of surface active agents, from the viewpoint of both chemical and physical properties, can be obtained when a mixture of propylene oxide and a minor proportion of ethylene oxide, such as such a mixture containing about 5–40 weight percent ethylene oxide, is used in preparing the hydrophobic polyoxypropylene polyol instead of just propylene oxide, itself. Surprisingly, it has been found that even when comparisons are made between compounds of U.S. 2,674,619 and compositions of this invention wherein the molecular weight of the hydrophobic polyoxypropylene chains and the weight percent of solubilizing polyoxyethylene chains were the same in each case, the compositions of this invention show a completely new and unpredictable combination of such important properties as cloud point, foam height and detergency, as measured by carbon soil removal value.

Thus, it will be readily appreciated that a further advance in the surface active agent art is represented by the compositions of this invention since flexibility in chemical and physical properties is increased. Frequently, success or failure in the use of any particular surface active agent depends on the presence of a precise balance of surface active properties in the surfactant. The range of properties that can be obtained in the surfactants of U.S. 2,674,-619 based on blocks of oxypropylene and oxyethylene chains has been significantly expanded by the present invention wherein a mixture of propylene oxide and ethylene oxide containing about 5–40 weight percent ethylene oxide is used to prepare the hydrophobiv polyoxypropylene chains.

Before discussing the new compositions and method of this invention in detail, it would be well to amplify the terms "mixtures," "conjugated" and "block" as used in this specification and in the appended claims to describe the compositions of the invention. It is well recognized in the field of alkylene oxide chemistry that when one subjects a reactive hydrogen compound to oxyalkylation, such as oxyethylation or oxypropylation, what is actually produced is a polymer of the alkylene oxide except for the terminal group. Furthermore, where the amount of the alkylene oxide employed is relatively large, one does not obtain a single molecular compound having a defined number of oxyalkylene radicals, but rather, one obtains a "mixture" of closely related homologues wherein the statistical average number of oxyalkylene groups equals the number of mols of the alkylene oxide employed and the individual members present in the mixture contain varying numbers of oxyalkylene groups. Thus, the compositions of this invention are "mixtures" of compounds which are defined by molecular weight and weight percent. When molecular weight is referred to in this specification and claims, there is meant the average theoretical molecular weight which equals the total of the grams of the propylene oxide-ethylene oxide mixture employed per mol of reactive hydrogen compound. In the examples of materials given herein according to U.S. 2,674,619, the theoretical molecular weight of the oxypropylene chain equals the total grams of propylene oxide per mol of reactive hydrogen compound.

The compositions of U.S. 2,674,619 and of this invention are such mixtures which are further defined as being "conjugated" or "block" polymers of alkylene oxides. Thus, compositions derived by simply condensing simultaneously about equal parts of ethylene oxide and propylene oxide, such as the lubricant compositions disclosed in Toussaint et al., U.S. 2,425,845, are distinguished since in the latter case a heteric oxyethylene-oxypropylene chain is obtained wherein the different oxyalkylene groups are distributed randomly throughout the entire composition. On the other hand, the compositions of this invention contain a block of oxyethylene groups in a chain connected to a block of different oxyalkylene groups in a chain, that is, the defined mixture of propylene oxide and ethylene oxide, thus providing the conjugated or repeated unit structure which is necessary for hydrophobic and hydrophilic properties. As has been noted hereinabove, the starting material for preparing the compositions of the invention is a low molecular weight reactive hydrogen compound. This fact is of the utmost importance in distinguishing the compositions of the invention from surface active agents of the prior art wherein alkylene oxides have been employed for various purposes.

U.S. 2,674,619 contains the first disclosure of surface active compositions wherein the hydrophobic element derives its hydrophobic properties strictly from a defined oxypropylene chain. Compositions of the prior art wherein ethylene oxide is condensed with an initially water-insoluble, relatively high molecular weight and hydrophobic reactive hydrogen compound, or even where propylene oxide is initially condensed with such a starting material followed by oxethylation, obviously cannot derive the hydrophobic characteristic necessary in a surface active agent from an oxyalkylene chain since such a characteristic is already provided by the starting material. For example, U.S. 2,552,532 discloses a series of compositions obtained by condensing, initially, ethylene oxide and, subsequently, propylene oxide with polypentaerythritols, such as tri-, tetra-, penta- and higher pentaerythritols. We have found that the lowest member of the series, tripentaerythritol, is sufficiently hydrophobic in itself so that a surfactant is obtained by merely condensing ethylene oxide therewith. The higher members of the series are even more hydrophobic and so such compositions are comparable to other alkylene oxide condensate surfactants of the prior art wherein a hydrocarbon radical supplies the hydrophobic characteristic for the surfactant and not the properly defined oxypropylene chains set forth in the compositions of this invention. So also in the compositions of this invention, the hydrophobic characteristic is directly attributable to the defined heteric oxypropylene-oxyethylene chains and the reactive hydrogen compound employed must not be sufficiently hydrophobic in itself so that a surfactant could be obtained merely by condensing a solubilizing amount of ethylene oxide therewith. If the latter type of reactive hydrogen compound were used, flexibility of properties would be largely lost since the hydrophobic characteristic of the surfactant would be dominated by the starting material.

It will be noted that the starting material-reactive hydrogen compound generally has very little effect on the properties of the compositions of the invention, since by definition, the reactive hydrogen compound cannot be one which contributes significantly to the hydrophobic characteristic of the composition. This is true in spite of the fact that a major distinction from the prior art in the compositions of the invention lies in the fact that a hereindefined reactive hydrogen compound is employed as discussed above. The reactive hydrogen compound used in preparing the compositions of this invention and in carrying out the method of the invention must fulfill two conditions, initially:

(1) Its reactive hydrogen atoms must be sufficiently labile to open the epoxide ring of ethylene oxide; and
(2) The reactive hydrogen compound must react with methyl magnesium iodide to liberate methane in the classical Zerewitinoff reaction (see Nierderl and Nierderl, Micromethods of Quantitative Organic Analysis, page 263, John Wiley and Sons, New York City, 1946).

Furthermore, as stated hereinabove, the reactive hydrogen compound must be a relatively low molecular weight, water-soluble compound, such as one having up to about 6 carbon atoms, and must have at least 2, and preferably not more than about 6, reactive hydrogen atoms. It will be recognized, however, that a fairly broad range of reactive hydrogen compounds falls within this definition.

Thus, the lower molecular weight, aliphatic, polyhydric alcohols constitute one class of reactive hydrogen compounds that is especially useful in preparing the compositions of this invention. Such alcohols can have from about 2 to 6, inclusive, carbon atoms per molecule, and examples of these materials are ethylene glycol, propylene glycol, 2,3-butylene glycol, 1,3-butylene glycol, 1,5-pentanediol, 1,6-hexanediol, glycerol, trimethylolpropane, sorbitol, sucrose and the like. Another class of reactive hydrogen compounds that can be used is the alkylamines and alkylene polyamines having at least 2 reactive hydrogen atoms, such as methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides constitute a further class of such reactive hydrogen compounds, such as acetamide, succinamide and benzenesulfonamide. A still further class of such reactive hydrogen compounds is the di- and polycarboxylic acids, such as adipic acid, succinic acid, glutaric acid, aconitic acid, diglycollic acid, and the like. It will be recognized that the reactive hydrogen compound can be one containing different functional groups having reactive hydrogen atoms, also, such as citric acid, glycollic acid, ethanolamine, and the like. Still other such reactive hydrogen compounds can also be used so long as the particular compound meets the requirements set forth, i.e., relatively low molecular weight, reactivity with ethylene oxide and at least 2 reactive hydrogen atoms.

The compositions of this invention are prepared by initially condensing a suitable reactive hydrogen compound with a mixture of propylene oxide and ethylene oxide containing 5-40 weight percent of ethylene oxide. Since the reactive hydrogen compound has a plurality of reactive hydrogen atoms, there are formed a plurality of heteric polyoxypropylene-polyoxyethylene chains attached at one end thereof to the reactive hydrogen compound at the sites of its reactive hydrogen atoms. The amount of the propylene oxide-ethylene oxide mixture used can be varied widely so long as a definite minimum is observed. The minimum amount is that which corresponds to a molecular weight of about 1000, in most cases. The precise minimum molecular weight required in the heteric polyoxypropylene-polyoxyethylene polymer is a function of both the ratio of oxypropylene and oxyethylene groups contained therein and the particular reactive hydrogen compound used in initiating the condensation of the propylene oxide and ethylene oxide in its preparation.

In considering the relative proportions of oxypropylene and oxyethylene groups that can be included in the heteric polyoxypropylene-polyoxyethylene compounds, U.S. 2,674,619 discloses that straight polyoxypropylene polymers of relatively high molecular weight, i.e., above 900, are hydrophobic, whereas polyoxyethylene polymers are hydrophilic at all molecular weights. Experimentally it has been observed that at any given molecular weight the hydrophobic and/or hydrophilic characteristics of the heteric polyoxypropylene-polyoxyethylene polymers are intermediate between polyoxypropylene and polyoxyethylene polymers of the same molecular weight. Consequently, there is a maximum percentage of oxyethylene groups that can be included in the heteric polyoxypropylene-polyoxyethylene polymer. In this work it has been observed that it is possible to prepare compounds of the present invention when the heteric polyoxypropylene-polyoxyethylene polymer contains as much as 40 weight percent oxyethylene groups. While under certain circumstances it probably is possible to incorporate higher percentages of oxyethylene groups in the heteric polyoxypropylene-polyoxyethylene polymers and still obtain operable compounds, 40 weight percent may be considered as a practical upper limit on the oxyethylene content of the heteric polyoxypropylene-polyoxyethylene polymers.

As indicated, however, the amount of the mixture of propylene oxide and ethylene oxide used, and therefore, the molecular weight of the reactive hydrogen compound-oxypropylene-oxyethylene condensate, can be varied widely in an upward direction. Effective surface active compositions of the invention are obtained when the molecular weight of the reactive hydrogen compound-oxypropylene-oxyethylene condensate ranges up to 25,000 and higher, and in the most important compositions of this invention, from a commercial detergent viewpoint, the molecular weight falls in the range of about 1500 to 20,000.

Following the preparation of the hydrophobic reactive hydrogen compound-oxypropylene-oxyethylene condensate, the condensate is then condensed with ethylene oxide so as to provide hydrophilic oxyethylene chains which are attached to the other ends of the heteric polyoxypropylene-polyoxyethylene chains. The amount of ethylene oxide so employed is that which provides polyoxyethylene chains which constitute from 5-90 weight percent of the total composition.

The compounds of this invention which contain 20-80% of oxyethylene chains are in the main excellent laundry detergents and especially good properties are obtained when the polyoxyethylene chains constitute 30-70% of the product. On the other hand, the compounds of this invention which contain 5-20% of oxyethylene chains generally find their principal fields of application in other industrial arts. In particular, many compounds which contain 5-20% of oxyethylene units have a relatively high solubility in many nonpolar solvents and for this reason may be employed as surface active agents in formulated dry cleaning solvents. Another outstanding characteristic of the compounds having low oxyethylene contents is their extraordinary ability to remove grease from raw wool, as measured by the method of Barnett and Powers (The Journal of the Society of Cosmetic Chemists, vol. 2, page 219 (1951)). Compounds having high oxyethylene contents of 80-90% are excellent dispersing agents.

In addition to its influence on surface active properties, the oxyethylene chain content has an important effect on the physical properties of the surface active agents of this invention. At relatively low oxyethylene chain contents, e.g. 5-30%, the compounds are liquids having the consistency of light lubricating oils. As the oxyethylene chain content is increased the compounds become more viscous until at about 65% oxyethylene chain content they assume the properties of a paste and as the oxyethylene chain content is further increased they become progressively higher melting and assume the properties of waxes at about 80% oxyethylene chain content. This feature of these compounds is very desirable, since highly active surface active agents can be prepared in a wide variety of physical forms. Of particular significance is the fact that nonionic detergents containing 100% active agent can be prepared in the solid state.

The actual reaction conditions used in carrying out the alkylene oxide condensation reactions which are necessary in order to obtain the compositions and to carry out the method of the invention are well known in the art. The disclosure of U.S. 2,674,619, columns 4 and 5, sets these conditions forth and this disclosure in combination with the disclosure in the examples to follow describes the alkylene oxide reactions adequately.

The compositions of this invention are particularly useful as detergents and tests which have been made on the compositions of the invention to show their usefulness as detergents include the Carbon Soil Removal Test described in U.S. 2,674,619, column 6, lines 18–75, and column 7, lines 1–49. The result of this test is a carbon soil removal value taken at either 90° F. or 140° F. for the test composition which expresses its detergency in terms of its percentage effectiveness when compared to the standard 0.25% solution of sodium kerylbenzenesulfonate described in the test procedure referred to above. Other tests which I have made relate to the cloud point of the compositions and the foam height produced by the compositions under controlled conditions.

The cloud point test is carried out by heating a 10 weight percent solution of the test composition in distilled water in a test tube placed in a water bath. The water bath is gradually heated at a rate of about one degree a minute and so that the bath temperature is not more than 5–10 degrees centigrade higher than the test solution particularly near the cloud point. The test solution is agitated by a low-speed propeller-type stirrer and the cloud point observation of the test solution is made against a dark background. The cloud point is taken as the temperature at which definite milky striations or minute but discrete particles of a separate phase are observed.

The foam height test is carried out by placing 10 liters of a 0.10 weight percent solution of the test composition in tap water in a Pyrex glass jar measuring 10" in diameter and 10" in height. The Pyrex jar is equipped with a propeller-type stirrer, knife blade heaters, a thermoregulator and a thermometer. A small, centrifugal pump is arranged to circulate the solution in the jar through a calibrated glass flow meter to a jet orifice prepared from the base of a No. 20 Becton, Dickinson and Company hypodermic needle by enlarging the hole in the base with a No. 56 twist drill. The jet orifice is mounted coaxially inside a Pyrex glass tube (51 mm. by 910 mm.) which is placed vertically in the solution. The jet is arranged so that it is 600 mm. above the surface of the solution in the jar, and the Pyrex glass tube is arranged so as to project 210 mm. below the surface of the solution. The test solution is heated to and maintained at 120° F. The centrifugal pump is started and a flow rate of 400 ml. per minute of the solution is metered through the jet. The flow is adjusted by by-passing part of the solution stream back into the jar before passage through the flow meter. The solution passing through the jet is directed against the wall of the vertical tube while the flow is adjusted and while the temperature is brought to equilibrium in order to prevent foaming prior to the actual test. The jet is then arranged so as to pass the solution coaxially downward through the tube without touching the tube walls to impinge upon the surface of the solution located in the Pyrex tube. Time is measured from the instant the solution impinges on the liquid surface and the resulting foam is measured at the end of 10 minutes. The foam height readings are obtained from a calibration on the outside of the Pyrex tube with the zero mark at the surface of the solution and are expressed in millimeters.

The compositions of this invention have entirely different combinations of these three detergency properties, carbon soil removal value, cloud point and foam height, than the compositions of U.S. 2,674,619. Generally, the compositions of the invention have higher cloud points, lower foam heights and at least as good carbon soil removal values at 140° F. A detailed review of the comparison examples to follow will reveal a definite trend is in the direction of higher cloud points for the compositions of the invention which is an important advantage. The compositions of the invention and the compositions of U.S. 2,674,619 which were tested were about equally divided with respect to superiority in carbon soil removal values at 140° F. and lower foaming. Most significant, however, is the clear showing that entirely new combinations of properties are provided by the compositions of the invention which is an important contribution toward improving the flexibility of a series of surfactants based on polyoxyalkylene compounds.

EXAMPLES

A series of surfactant compositions was prepared employing reactive hydrogen compounds exemplary of the classes of such materials disclosed hereinabove in accordance with this invention. The procedure which exemplifies the method of this invention was generally the same throughout although variations in operating conditions and equipment were made to a certain extent in order to expedite the reactions and because of volume limitations dictated by the reactors employed.

The reactors employed were a one gallon, stainless steel autoclave equipped with a stirrer, thermocouple, pressure gage and reactant inlet tube whose outlet was directly under the stirrer; and, in some cases, a 3-necked glass flask equipped with a stirrer, condenser, thermometer and alkylene oxide inlet tube. The exact conditions, materials and weights of materials used are summarized in Table I below. In general, the reactive hydrogen compound and catalyst were initially charged into the reactor. The amount of catalyst charged to the reactor at the start of each stage is indicated in Table I and a dash (—) means that no additional catalyst was used. In the runs where N-methylmorpholine or water was used as a solvent-catalyst, the reactor was washed and dried following removal of the first stage product before charging KOH catalyst for the second and subsequent stages. Also, in those runs where N-methylmorpholine or water was used in the first stage, the product of the first stage was stripped at 100° C. and about 4 mm. Hg pressure for 1 hour before charging a portion of this product to the second stage.

A mixture of propylene oxide and ethylene oxide having the proportions set forth in Table I was then admitted to the reactor while maintaining a reaction temperature in the range of 50–135° C. and average pressure of 1–90 p.s.i.g. The total reaction time varied from about 3–30 hours. Because of volume limitations imposed by the reactors, the hydrophobic reactive hydrogen compound-polyoxypropylene-polyoxyethylene condensate was made in stages, taking the indicated amount of the product of the first stage, charging it back into the reactor for further reaction with the propylene oxide-ethylene oxide mixture as indicated. When the hydrophobic polyoxypropylene-polyoxyethylene condensate having the desired molecular weight was obtained after a reaction of the reactive hydrogen compound with the propylene oxide-ethylene oxide mixture in 3 or 4 stages, the indicated amount of the intermediate hydrophobic condensate was then charged to the reactor and ethylene oxide was then admitted under the indicated reaction conditions in the amount necessary to obtain oxyethylene chains providing the weight percentage of the total compositions stated in the table. Compositions according to this invention were thus prepared and the reaction conditions are set forth below in Table I.

Table I
COMPOSITIONS OF INVENTION SUMMARY OF REACTION CONDITIONS

| Ex. No. | Reactive hydrogen compound (RHC) used | Stage | Amount RHC (or oxyalkylene condensate from previous stage) used, grams (mols) | Amount catalyst[1] used, grams | Amount of propylene oxide (PO) and ethylene oxide (EO) mixture | | | | | Ethylene oxide,[2] grams, (mols) | Total reaction time, hrs. | Avg. temp., °C. | Avg. press p.s.i.g. |
|---|---|---|---|---|---|---|---|---|---|---|---|---|---|
| | | | | | PO | | EO | | Weight ratio of PO/EO | | | | |
| | | | | | Grams | Mols | Grams | Mols | | | | | |
| 1 | Glycerine | A | RHC, 400(4.35) | a 40.7 | 1,768 | 30.5 | 432 | 9.8 | 80/20 | | 9.7 | 125 | 30 |
| | | B | A, 400(0.67) | (—) | 1,816 | 31.3 | 454 | 10.3 | 80/20 | | 10.4 | 125 | 50 |
| | | C | B, 830(0.29) | (—) | | | | | | 700(15.9) | 6.0 | 125 | 55 |
| 2 | Pentaerythritol | A | RHC, 544(4.00) | b 410.0 | 810 | 14.0 | 90 | 2.1 | 90/10 | | 4.0 | 125 | 45 |
| | | B | A, 400(1.11) | a 10.4 | 2140 | 36.9 | 238 | 5.4 | 90/10 | | 14.3 | 125 | 85 |
| | | C | B, 400(0.16) | (—) | 1,008 | 17.4 | 112 | 2.5 | 90/10 | 768(17.5) | 20.2 | 135 | 80 |
| 3 | 1, 5-Pentanediol | A | RHC, 400(3.85) | a 36.0 | 1,912 | 33.0 | 478 | 10.9 | 80/20 | | 16.7 | 125 | 85 |
| | | B | A, 400(0.55) | (—) | 1,664 | 28.7 | 416 | 9.4 | 80/20 | | 12.6 | 125 | 70 |
| | | C | B, 830(0.18) | (—) | 214 | 3.7 | 53 | 1.2 | 80/20 | 534(12.1) | 6.6 | 125 | 80 |
| 4 | Trimethylolpropane | A | RHC, 400(2.99) | a 28.0 | 1,720 | 29.7 | 570 | 13.0 | 75/25 | | 14.9 | 125 | 70 |
| | | B | A, 400(0.45) | (—) | 1,800 | 31.0 | 600 | 13.7 | 75/25 | | 22.3 | 130 | 90 |
| | | C | B, 830(0.13) | (—) | 162 | 2.8 | 54 | 1.2 | 75/25 | 444(10.1) | 4.8 | 135 | 50 |
| 5 | n-Butylamine | A | RHC, 342(4.68) | c 67.0 | 543 | 9.4 | 29 | 0.7 | 95/5 | | 3.3 | 65 | 25 |
| | | B | A, 400(2.05) | a 11.2 | 1,957 | 33.9 | 103 | 2.3 | 95/5 | | 13.0 | 100 | 65 |
| | | C | B, 400(0.33) | (—) | 407 | 7.0 | 22 | 0.5 | 95/5 | 413(9.4) | 7.5 | 125 | 60 |
| 6 | Diethylenetriamine | A | RHC, 400(3.88) | c 70.0 | 914 | 15.8 | 161 | 3.7 | 85/15 | | 6.0 | 100 | 35 |
| | | B | A, 400(1.05) | a 9.8 | 2,040 | 35.2 | 360 | 8.2 | 85/15 | | 17.3 | 125 | 65 |
| | | C | B, 400(0.15) | (—) | 935 | 16.1 | 165 | 3.8 | 85/15 | 750(17.1) | 20.0 | 125 | 75 |
| 7 | Ethylamine | A | RHC, 158(3.50) | c 67.0 | 330 | 5.7 | 58 | 1.3 | 85/15 | | 4.5 | 50 | 1 |
| | | B | A, 400(2.57) | a 24.0 | 2,031 | 35.1 | 359 | 8.2 | 85/15 | | 14.1 | 100 | 75 |
| | | C | B, 400(0.37) | (—) | 598 | 10.0 | 106 | 2.4 | 85/15 | 552(12.5) | 5.9 | 125 | 50 |
| 8 | Ethylenediamine | A | RHC, 340(5.67) | c 60.0 | 1,230 | 21.3 | 64 | 1.5 | 95/5 | | 7.3 | 115 | 50 |
| | | B | A, 580(2.00) | d 13.2 | 1,670 | 28.8 | 90 | 2.1 | 95/5 | | 7.5 | 125 | 35 |
| | | C | B, 450(0.38) | (—) | 388 | 15.4 | 47 | 1.1 | 95/5 | 462(10.5) | 8.3 | 125 | 55 |
| 9 | do | A | RHC, 340(5.67) | c 60.0 | 1,148 | 19.8 | 128 | 2.9 | 90/10 | | 5.3 | 115 | 35 |
| | | B | A, 570(2.00) | d 13.2 | 1,593 | 27.5 | 177 | 4.0 | 90/10 | | 6.5 | 125 | 35 |
| | | C | B, 450(0.38) | (—) | 841 | 14.5 | 94 | 2.1 | 90/10 | 462(10.5) | 9.3 | 125 | 50 |
| 10 | do | A | RHC, 340(5.67) | c 60.0 | 992 | 17.1 | 248 | 5.6 | 80/20 | | 5.5 | 112 | 25 |
| | | B | A, 560(2.00) | d 13.2 | 1,424 | 24.6 | 356 | 8.1 | 80/20 | | 6.8 | 125 | 30 |
| | | C | B, 450(0.38) | (—) | 748 | 12.9 | 187 | 4.3 | 80/20 | 462(10.5) | 10.3 | 125 | 55 |
| 11 | do | A | RHC, 340(5.67) | c 60.0 | 700 | 12.1 | 468 | 10.6 | 60/40 | | 5.3 | 115 | 35 |
| | | B | A, 530(2.00) | d 13.2 | 768 | 13.3 | 512 | 11.6 | 60/40 | | 6.5 | 125 | 35 |
| | | C | B, 450(0.38) | (—) | 561 | 9.7 | 374 | 8.5 | 60/40 | 462(10.5) | 5.5 | 125 | 45 |
| 12 | 1, 6-hexanediamine | A | RHC, 288(2.48) | c 112.0 | 506 | 8.7 | 56 | 1.3 | 90/10 | | 3.0 | 125 | 24 |
| | | B | A, 400(1.17) | a 10.9 | 2,277 | 39.3 | 253 | 5.7 | 90/10 | | 14.0 | 125 | 70 |
| | | C | B, 400(0.16) | (—) | 1,368 | 23.6 | 152 | 3.5 | 90/10 | 960(21.8) | 29.3 | 125 | 70 |
| 13 | 2-methylpiperazine | A | RHC, 450(4.50) | c 150.0 | 455 | 7.8 | 51 | 1.2 | 90/10 | | 5.0 | 90 | 15 |
| | | B | A, 400(1.89) | a 17.7 | 2,160 | 37.2 | 240 | 5.5 | 90/10 | | 20.7 | 125 | 85 |
| | | C | B, 400(0.27) | (—) | 247 | 4.3 | 27 | 0.6 | 90/10 | 338(7.7) | 4.5 | 125 | 40 |
| 14 | Acetamide | A | RCH, 200(3.39) | a 31.8 | 343 | 5.9 | 38 | 0.9 | 90/10 | | 4.0 | 100 | 1 |
| | | B | A, 400(2.34) | (—) | 1,746 | 30.1 | 194 | 4.4 | 90/10 | | 10.0 | 125 | 25 |
| | | C | B, 400(0.40) | (—) | 720 | 12.4 | 80 | 1.8 | 90/10 | 600(13.6) | 5.2 | 125 | 75 |
| 15 | Benzenesulfonamide | A | RCH, 350(2.23) | b 175.0 | 180 | 3.1 | 60 | 1.4 | 75/25 | | 4.8 | 100 | 1 |
| | | B | A, 400(1.51) | a 14.1 | 1,852 | 32.0 | 617 | 14.0 | 75/25 | | 10.3 | 125 | 35 |
| | | C | B, 400(0.21) | (—) | 522 | 9.0 | 174 | 3.9 | 75/25 | 528(12.0) | 6.3 | 125 | 35 |
| 16 | Propylene glycol | A | RCH, 440(5.79) | d 38.0 | 2,074 | 35.8 | 235 | 5.34 | 90/10 | | 4.8 | 125 | 15 |
| | | B | A, 900(1.90) | (—) | 1,748 | 30.1 | 193 | 4.4 | 90/10 | | 3.3 | 125 | 45 |
| | | C | B, 693(0.46) | (—) | | | | | | 555(12.6) | 3.3 | 125 | 51 |
| 17 | do | A | RCH, 440(5.79) | d 38.0 | 2,074 | 35.8 | 235 | 5.34 | 90/10 | | 4.8 | 125 | 15 |
| | | B | A, 570(1.20) | (—) | 1,977 | 34.1 | 216 | 4.91 | 90/10 | | 5.2 | 125 | 40 |
| | | C | B, 902(0.39) | —() | | | | | | 360(8.2) | 1.9 | 125 | 60 |
| 18 | do | A | RCH, 440(5.79) | d 38.0 | 2,074 | 35.8 | 235 | 5.34 | 90/00 | | 4.8 | 125 | 15 |
| | | B | A, 570(1.20) | (—) | 1,977 | 34.1 | 216 | 4.91 | 90/10 | | 5.2 | 125 | 40 |
| | | C | B, 708(0.31) | (—) | | | | | | 460(10.5) | 1.9 | 125 | 75 |
| 19 | do | A | RHC, 440(5.79) | d 38.0 | 2,074 | 35.8 | 235 | 5.34 | 90/10 | | 4.8 | 125 | 15 |
| | | B | A, 570(1.20) | (—) | 1,977 | 34.1 | 216 | 4.91 | 90/10 | | 5.2 | 125 | 40 |
| | | C | B, 500(0.27) | (—) | | | | | | 2,000(45.4) | 8.4 | 125 | 75 |
| 20 | do | A | RHC, 440(5.79) | d 38.0 | 2,074 | 35.8 | 235 | 5.34 | 90/10 | | 4.8 | 125 | 15 |
| | | B | A, 334(0.70) | (—) | 2,045 | 35.3 | 230 | 5.23 | 90/10 | | 5.7 | 125 | 80 |
| | | C | B, 900(0.24) | (—) | | | | | | 300(6.8) | 3.3 | 125 | 65 |
| 21 | do | A | RHC, 440(5.8) | d 38.6 | 1,616 | 27.9 | 695 | 15.8 | 70/30 | | 3.8 | 125 | 25 |
| | | B | A, 350(0.74) | (—) | 1,667 | 28.7 | 712 | 16.2 | 70/30 | | 5.8 | 125 | 50 |
| | | C | B, 900(0.24) | (—) | | | | | | 300(6.8) | 2.0 | 125 | 64 |
| 22 | do | A | RHC, 440(5.79) | d 38.0 | 2,074 | 35.8 | 235 | 5.34 | 90/10 | | 4.8 | 125 | 15 |
| | | B | A, 334(0.70) | (—) | 2,045 | 35.3 | 230 | 5.23 | 90/10 | | 5.7 | 125 | 80 |
| | | C | B, 696(0.19) | (—) | | | | | | 571(13.0) | 2.6 | 125 | 80 |
| 23 | do | A | RHC, 440(5.79) | d 38.0 | 2,074 | 35.8 | 235 | 5.34 | 90/10 | | 4.8 | 125 | 15 |
| | | B | A, 334(0.70) | (—) | 2,045 | 35.3 | 230 | 5.23 | 90/10 | | 5.7 | 125 | 80 |
| | | C | B, 700(0.19) | (—) | | | | | | 574(13.1) | 3.4 | 125 | 70 |

[1] a = Potassium hydroxide; b = N-methylmorpholine; c = water; d = sodium hydroxide.
[2] Ethylene oxide used for solubilizing oxyethylene chains only.

Thus, Table I above summarizes the conditions under which surfactant compositions according to the present invention were prepared. These compositions are summarized in Table II below which reports the reactive hydrogen compound used, the weight percent of the total composition attributable to the oxyethylene chains and the total theoretical molecular weight of the heteric oxypropylene-oxyethylene chains.

Table II
COMPOSITIONS OF INVENTION

| Ex. No. | Reactive hydrogen compound | Heteric oxypropylene (PO)—oxyethylene (EO) chains | | Oxyethylene chains, weight percent |
|---|---|---|---|---|
| | | Mol. weight [1] | Weight ratio, PO/EO | |
| 1 | Glycerine | 4,000 | 80/20 | 47 |
| 2 | Pentaerythritol | 9,500 | 90/10 | 34 |
| 3 | 1,5-pentanediol | 6,000 | 80/20 | 33 |
| 4 | Trimethylolpropane | 8,000 | 75/25 | 30 |
| 5 | n-Butylamine | 2,500 | 95/5 | 33 |
| 6 | Diethylenetriamine | 10,000 | 85/15 | 33 |
| 7 | Ethylamine | 3,000 | 85/15 | 33 |
| 8 | Ethylenediamine | 3,600 | 95/5 | 25 |
| 9 | do | 3,600 | 90/10 | 25 |
| 10 | do | 3,600 | 80/20 | 25 |
| 11 | do | 3,600 | 60/40 | 25 |
| 12 | 1,6-hexanediamine | 12,000 | 90/10 | 33 |
| 13 | 2-methylpiperazine | 2,500 | 90/10 | 33 |
| 14 | Acetamide | 3,000 | 90/10 | 33 |
| 15 | Benzenesulfonamide | 5,200 | 75/25 | 32 |
| 16 | Propylene glycol | 1,500 | 90/10 | 45 |
| 17 | do | 2,300 | 90/10 | 29 |
| 18 | do | 2,300 | 90/10 | 40 |
| 19 | do | 2,300 | 90/10 | 80 |
| 20 | do | 3,720 | 90/10 | 25 |
| 21 | do | 3,720 | 70/30 | 25 |
| 22 | do | 3,720 | 90/10 | 45 |
| 23 | do | 3,720 | 70/30 | 45 |

[1] Includes molecular weight of reactive hydrogen compound.

A parallel series of surfactant compositions according to U.S. 2,674,619 was also prepared wherein the reactive hydrogen compound was initially condensed with propylene oxide and the thus produced polyoxypropylene polyol was then condensed with ethylene oxide. These compositions were prepared with the proper amount of propylene oxide and ethylene oxide so that the weight percent oxyethylene chains and molecular weight of the oxypropylene chains were the same as in the compositions according to this invention summarized above in Tables I and II. Thus, direct comparisons were then possible and were made so as to demonstrate the difference in detergency properties between the compositions of the invention and the compositions of U.S. 2,674,619.

The compositions according to U.S. 2,674,619 were prepared in stages following the same general procedure and with the same equipment as that already described for the compositions of the invention summarized in Tables I and II. The significant difference from the method employed in the examples recorded in Tables I and II is, of course, that the reactive hydrogen compound was initially condensed with propylene oxide in the examples in Table III rather than the propylene oxide-ethylene oxide mixture in accordance with this invention. The preparation of the compositions of U.S. 2,674,619 is summarized below in Table III.

Table III
COMPOSITIONS OF U.S. 2,674,619—SUMMARY OF REACTION CONDITIONS

| Ex. No. | Reactive hydrogen compound (RHC) used | Stage | Amount RHC (or oxyalkylene condensate from previous stage) used, grams (mols) | Amount catalyst [1] used, grams | Amount propylene oxide added | | Amount ethylene oxide added | | Total reaction time, hrs. | Avg. temp., °C. | Avg. press., p.s.i.g. |
|---|---|---|---|---|---|---|---|---|---|---|---|
| | | | | | Grams | Mols | Grams | Mols | | | |
| 24 | Glycerine | A | RHC, 460(5.00) | a 47.0 | 2,290 | 39.5 | | | 7.0 | 125 | 35 |
| | | B | A, 400(0.73) | (—) | 2,510 | 43.3 | | | 9.8 | 125 | 80 |
| | | C | B, 1,200(0.30) | (—) | | | 1,050 | 24.0 | 3.7 | 125 | 75 |
| 25 | Pentaerythritol | A | RHC, 545(4.00) | b 410.0 | 928 | 16.0 | | | 3.8 | 125 | 50 |
| | | B | A, 500(1.37) | a 12.8 | 2,240 | 38.6 | | | 8.1 | 125 | 65 |
| | | C | B, 500(0.25) | (—) | 1,875 | 32.4 | | | 6.8 | 135 | 100 |
| | | D | C, 950(0.10) | (—) | | | 480 | 10.9 | 2.6 | 135 | 75 |
| 26 | 1,5-pentanediol | A | RHC, 178(1.71) | a 16.0 | 232 | 4.0 | | | 5.5 | 120 | 1 |
| | | B | A, 400(1.67) | (—) | 2,435 | 42.0 | | | 9.1 | 125 | 45 |
| | | C | B, 400(0.25) | (—) | 1,100 | 19.0 | 750 | 17.1 | 23.6 | 125 | 75 |
| 27 | Trimethylolpropane | A | RHC, 400(2.99) | a 29.0 | 1,850 | 31.9 | | | 5.8 | 125 | 25 |
| | | B | A, 425(0.57) | (—) | 2,410 | 41.5 | | | 7.3 | 125 | 75 |
| | | C | B, 500(0.13) | (—) | 500 | 8.6 | 438 | 10.0 | 8.3 | 135 | 70 |
| 28 | n-Butylamine | A | RHC, 1,460(20.00) | c 50.0 | 2,320 | 40.0 | | | 8.8 | 90 | 1 |
| | | B | A, 400(2.12) | a 19.8 | 1,720 | 29.7 | | | 6.8 | 125 | 25 |
| | | C | B, 800(0.80) | (—) | 1,200 | 20.7 | | | 4.8 | 125 | 55 |
| | | D | C, 800(0.32) | (—) | | | 400 | 9.1 | 2.2 | 125 | 50 |
| 29 | Diethylenetriamine | A | RHC, 940(9.13) | c 235.0 | 2,650 | 45.6 | | | 6.0 | 95 | 1 |
| | | B | A, 400(1.00) | a 9.4 | 2,400 | 41.4 | | | 8.8 | 125 | 70 |
| | | C | B, 400(0.14) | (—) | 1,030 | 17.8 | 715 | 16.3 | 18.8 | 125 | 80 |
| 30 | Ethylamine | A | RHC, 158(3.50) | c 67.0 | 406 | 7.0 | | | 4.3 | 35 | 1 |
| | | B | A, 400(2.49) | a 23.3 | 2,400 | 41.4 | | | 10.0 | 100 | 40 |
| | | C | B, 400(0.36) | (—) | 668 | 11.5 | 534 | 12.1 | 9.1 | 125 | 50 |
| 31 | Ethylenediamine | A | RHC, 400(6.67) | c 70.0 | 1,550 | 26.6 | | | 5.0 | 115 | 35 |
| | | B | A, 700(2.40) | d 16.0 | 2,100 | 36.4 | | | 4.8 | 125 | 35 |
| | | C | B, 450(0.38) | (—) | 935 | 16.1 | 462 | 10.5 | 7.9 | 125 | 125 |
| 32 | 1,6-hexanediamine | A | RHC, 290(2.50) | c 51.0 | 580 | 10.0 | | | 11.0 | 120 | 1 |
| | | B | A, 400(1.15) | a 10.8 | 2,355 | 40.6 | | | 9.7 | 125 | 40 |
| | | C | B, 400(0.17) | (—) | 1,600 | 27.6 | | | 13.5 | 135 | 85 |
| | | D | C, 800(0.07) | (—) | | | 400 | 9.1 | 6.3 | 125 | 75 |
| 33 | 2-methylpiperazine | A | RHC, 400(4.00) | c 100.0 | 464 | 8.0 | | | 5.0 | 80 | 25 |
| | | B | A, 500(2.32) | a 21.7 | 2,280 | 39.3 | | | 8.3 | 125 | 40 |
| | | C | B, 879(0.73) | (—) | 952 | 16.4 | | | 4.4 | 125 | 75 |
| | | D | C, 800(0.33) | (—) | | | 400 | 9.1 | 1.5 | 125 | 65 |
| 34 | Acetamide | A | RHC, 177(3.00) | a 28.0 | 348 | 6.0 | | | 6.8 | 85 | 1 |
| | | B | A, 400(2.30) | (—) | 2,200 | 38.0 | | | 8.9 | 125 | 35 |
| | | C | B, 400(0.35) | (—) | 660 | 11.4 | 530 | 12.0 | 8.8 | 125 | 80 |
| 35 | Benzenesulfonamide | A | RHC, 235(1.50) | b 118.0 | 174 | 3.0 | | | 5.8 | 100 | 1 |
| | | B | A, 326(1.19) | a 11.0 | 2,080 | 36.0 | | | 10.9 | 125 | 50 |
| | | C | B, 400(0.20) | (—) | 630 | 10.8 | 495 | 11.3 | 4.3 | 125 | 75 |

[1] a=Potassium hydroxide; b=N-methylmorpholine; c=water; d=sodium hydroxide.

The compositions of U.S. 2,674,619 which were prepared in order to make direct comparisons with the compositions of the invention are summarized below in Table IV showing the reactive hydrogen compound used, the molecular weight of the oxypropylene chains and the weight percent of each composition attributable to the oxyethylene chains. Also included in Table IV are Examples 36–41, inclusive, which are compositions made according to U.S. 2,674,619 employing propylene glycol as the reactive hydrogen compound. These latter examples were not specially prepared for this work and so the laboratory conditions under which they could be prepared are not summarized in Table III. Examples 36–41, inclusive, are surface active agents made by Wyandotte Chemicals Corporation and sold under the registered trademark, "Pluronic," and are grades L44, L62, L64, F68, L82 and L84, respectively, under which they are known in commerce.

Table IV
COMPOSITIONS OF U.S. 2,674,619

| Ex. No. | Reactive hydrogen compound | Oxypropylene chains, mol. weight [1] | Oxyethylene chains, weight percent |
|---|---|---|---|
| 24 | Glycerine | 4,000 | 47 |
| 25 | Pentaerythritol | 9,500 | 34 |
| 26 | 1,5-pentanediol | 6,000 | 33 |
| 27 | Trimethylolpropane | 8,000 | 30 |
| 28 | n-Butylamine | 2,500 | 33 |
| 29 | Diethylenetriamine | 10,000 | 33 |
| 30 | Ethylamine | 3,000 | 33 |
| 31 | Ethylenediamine | 3,600 | 25 |
| 32 | 1,6-hexanediamine | 12,000 | 33 |
| 33 | 2-methylpiperazine | 2,500 | 33 |
| 34 | Acetamide | 3,000 | 33 |
| 35 | Benzenesulfonamide | 5,200 | 32 |
| 36 | Propylene glycol | 1,500 | 45 |
| 37 | ——do—— | 2,300 | 29 |
| 38 | ——do—— | 2,300 | 40 |
| 39 | ——do—— | 2,300 | 80 |
| 40 | ——do—— | 3,720 | 25 |
| 41 | ——do—— | 3,720 | 45 |

[1] Includes molecular weight of reactive hydrogen compound.

Compositions according to this invention summarized in Table II and compositions according to U.S. 2,674,619 summarized in Table IV were tested for detergency as reflected by their carbon soil removal values as well as for cloud points and foam heights according to the procedures previously set forth for these tests. The results of these comparison tests are set forth below in Table V.

It will be apparent from a review of the data recorded in Table V that the major objective of this invention has been accomplished. That is, flexibility in the properties of surface active agents based on block polymers of propylene oxide and ethylene oxide has been significantly increased by our concept of initially condensing a defined mixture of propylene oxide and ethylene oxide with a relatively low molecular weight reactive hydrogen compound having a plurality of reactive hydrogen atoms and then condensing ethylene oxide with the initially produced hydrophobic polyoxypropylene-polyoxyethylene condensate. The tests made and results thereof which are recorded in Table V show unmistakably that the compositions of this inventon have distinctly different properties than the compositions of U.S. 2,674,619 wherein the relatively low molecular weight reactive hydrogen compound is initially condensed with propylene oxide and the thus produced polyoxypropylene polyol is then condensed with ethylene oxide. Cloud point is consistently higher in the compositions of this invention. Detergency as measured by the carbon soil removal test varies; in some cases the compositions of the invention produced significantly higher carbon soil removal values at 140° F. than did the compositions of U.S. 2,674,619, e.g., Examples 1, 2, 3, 4, 6, 7, 12, 13, 17, 18, 21 and 22 compared to Examples 24, 25, 26, 27, 29, 30, 32, 33, 37, 38, 40 and 41, respectively, while in other cases the compositions of U.S. 2,674,619 produced higher carbon soil removal values. In any case, an entirely different com-

Table V
COMPARISON OF DETERGENCY, FOAM HEIGHT AND CLOUD POINT PROPERTIES BETWEEN COMPOSITIONS OF INVENTION AND COMPOSITIONS OF U.S. 2,674,619

| Ex. No. | Reactive hydrogen compound (RHC) | Composition of invention | | | Composition of U.S. 2,674,619 | | Carbon soil removal | | Foam height at 120° F., mm. | Cloud point, °C. |
|---|---|---|---|---|---|---|---|---|---|---|
| | | Heteric oxypropylene chains Mol. weight [1] | PO/EO ratio | Oxyethylene chains, weight percent | Oxypropylene chains, mol. weight | Oxyethylene chains, weight percent | 90° F. | 140° F. | | |
| 1 | Glycerine | 4,000 | 80/20 | 47 | | | 116 | 220 | 580 | 83.0 |
| 24 | ——do—— | | | | 4,000 | 47 | 172 | 183 | [2] 395 | 74.3 |
| 2 | Pentaerythritol | 9,500 | 90/10 | 34 | | | 180 | 200 | 135 | 52.0 |
| 25 | ——do—— | | | | 9,500 | 34 | 145 | 117 | 555 | 39.5 |
| 3 | 1,5-Pentanediol | 6,000 | 80/20 | 33 | | | 133 | 261 | 335 | 56.5 |
| 26 | ——do—— | | | | 6,000 | 33 | 205 | 174 | 43 | 38.0 |
| 4 | Trimethylol propane | 8,000 | 72/25 | 30 | | | 136 | 213 | 50 | 57.5 |
| 27 | ——do—— | | | | 8,000 | 30 | 160 | 140 | 35 | 10.0 |
| 5 | n-Butylamine | 2,500 | 95/5 | 33 | | | 173 | 194 | 55 | 26.0 |
| 28 | ——do—— | | | | 2,500 | 33 | 286 | 280 | 40 | 59.5 |
| 6 | Diethylene-triamine | 10,000 | 85/15 | 33 | | | 220 | 246 | 230 | 72.0 |
| 29 | ——do—— | | | | 10,000 | 33 | 240 | 148 | 8 | 41.0 |
| 7 | Ethylamine | 3,000 | 85/15 | 33 | | | 156 | 300 | 245 | 59.0 |
| 30 | ——do—— | | | | 3,000 | 33 | 186 | 274 | 108 | 22.5 |
| 8 | Ethylenediamine | 3,600 | 95/5 | 25 | | | 213 | 145 | 28 | 43.0 |
| 9 | ——do—— | 3,600 | 90/10 | 25 | | | 178 | 148 | 55 | 56.5-80.0 |
| 10 | ——do—— | 3,000 | 80/20 | 25 | | | 159 | 216 | 30 | 87.0 |
| 11 | ——do—— | 3,600 | 60/40 | 25 | | | 134 | 183 | 75 | 74.5 |
| 31 | ——do—— | | | | 3,600 | 25 | 259 | 231 | | 35.0 |
| 12 | 1,6-hexane-diamine | 12,000 | 90/10 | 33 | | | 269 | 178 | 115 | 69.0 |
| 32 | ——do—— | | | | 12,000 | 33 | 243 | 123 | 590 | 87.0 |
| 13 | 2-methylpiperazine | 2,500 | 90/10 | 33 | | | 151 | 301 | 145 | 68.0 |
| 33 | ——do—— | | | | 2,500 | 33 | 200 | 285 | 235 | 23.0 |
| 14 | Acetamide | 3,000 | 90/10 | 33 | | | 132 | 222 | 40 | 57.0 |
| 34 | ——do—— | | | | 3,000 | 33 | 156 | 263 | 32 | 50.0 |
| 15 | Benzenesulfonamide | 5,200 | 75/25 | 32 | | | 97 | 29 | 123 | 53.0 |
| 35 | ——do—— | | | | 5,200 | 32 | 218 | 168 | 32 | 38.5 |
| 16 | Propylene glycol | 1,500 | 90/10 | 45 | | | 113 | 265 | 215 | 72.5 |
| 36 | ——do—— | | | | 1,500 | 45 | 211 | 7 | >600 | 69 |
| 17 | ——do—— | 2,300 | 90/10 | 29 | | | 164 | 35 | 32.5 | |
| 37 | ——do—— | | | | 2,300 | 29 | 283 | 170 | 23 | |
| 18 | ——do—— | 2,300 | 90/10 | 40 | | | 275 | >600 | 65 | |
| 38 | ——do—— | | | | 2,300 | 40 | 117 | 455 | 60 | |
| 19 | ——do—— | 2,300 | 90/10 | 80 | | | 138 | >600 | [3] None | |
| 39 | ——do—— | | | | 2,300 | 80 | 149 | 22 | [3] None | |
| 20 | ——do—— | 3,720 | 90/10 | 25 | | | 218 | 40 | 26 | |
| 21 | ——do—— | 3,720 | 70/30 | 25 | | | 160 | 40 | 57 | |
| 40 | ——do—— | | | | 3,720 | 25 | 255 | >600 | 23 | |
| 22 | ——do—— | 3,720 | 90/10 | 45 | | | 169 | 490 | 74 | |
| 23 | ——do—— | 3,720 | 70/30 | 45 | | | 218 | 585 | 84.5 | |
| 41 | ——do—— | | | | 3,720 | 45 | | | 53 | |

[1] Includes molecular weight of reactive hydrogen compound.
[2] Flow rate was 200 ml./min.
[3] "None" under cloud point means that the solution did not cloud when heated to its boiling point.

position from the point of view of chemical and physical properties is produced according to the concept of this invention. The comparisons are made, it should be noted, between pairs of compositions where the sole significant difference is the molecular structure which results from the presence of the minor proportion, i.e., 5–40 weight percent, of ethylene oxide in the propylene oxide used to produce the hydrophobic element of the surface active compositions.

I claim:

1. A surface active mixture of conjugated polyoxyalkylene compounds containing in their structure oxypropylene groups, oxyethylene groups and the nucleus of a reactive hydrogen compound having from 2 to about 6 reactive hydrogen atoms and having up to and including 6 carbon atoms per molecule and being a member selected from the group consisting of aliphatic polyhydric alcohols, alkylamines, alkylene polyamines, cyclic amines, amides and polycarboxylic acids, said compounds being characterized by having heteric polymeric chains of oxypropylene and oxyethylene groups attached at one of their ends to said nucleus of the reactive hydrogen compound at the sites of its reactive hydrogen atoms and by having chains of oxyethylene groups attached to the other ends of said heteric chains, said heteric polyoxypropylene-polyoxyethylene chains having from 5–40 weight percent of oxyethylene groups, based on the weight of said heteric chains, and having an average molecular weight of at least about 1000 and up to about 25,000 and the oxyethylene groups in said oxyethylene chains being sufficient in weight so as to constitute from about 5–90 weight percent of the mixture of surface active compounds.

2. A surface active mixture of conjugated polyoxyalkylene compounds according to claim 1 wherein said heteric polymeric chain of oxypropylene and oxyethylene groups has from 10–30 weight percent, based on the weight of said chain, of oxyethylene groups.

3. A surface active mixture of conjugated polyoxyalkylene compounds according to claim 1 wherein said reactive hydrogen compound is an aliphatic polyhydric alcohol.

4. A surface active mixture of conjugated polyoxyalkylene compounds according to claim 1 wherein said reactive hydrogen compound is an alkylamine.

5. A surface active mixture of conjugated polyoxyalkylene compounds according to claim 1 wherein said reactive hydrogen compound is an alkylene polyamine.

6. A surface active mixture of polyoxyalkylene compounds according to claim 1 wherein said reactive hydrogen compound is an amide.

7. A surface active mixture of polyoxyalkylene compounds according to claim 1 wherein said reactive hydrogen compound is a polycarboxylic acid.

8. A method which comprises, condensing a mixture of propylene oxide and ethylene oxide containing 5–40 weight percent of ethylene oxide with a reactive hydrogen compound having up to and including 6 carbon atoms per molecule and having from 2 to about 6 reactive hydrogen atoms, the amount of the propylene oxide-ethylene oxide mixture employed being sufficient that a first product is obtained containing heteric polyoxypropylene-polyoxyethylene chains having a molecular weight of at least about 1000 and up to about 25,000 formed on the reactive hydrogen compound at the sites of its reactive hydrogen atoms, and subsequently condensing ethylene oxide with said first product so that polyoxyethylene chains are attached to the free ends of said heteric chains, the amount of ethylene oxide so used being sufficient so that said polyoxyethylene chains constitute from 5–90 weight percent of the total product.

9. A surface active mixture of conjugated polyoxyalkylene compounds containing in their structure oxypropylene groups, oxyethylene groups and the nucleus of a reactive hydrogen compound having from 2 to about 6 reactive hydrogen atoms and having up to and including 6 carbon atoms per molecule and being a member selected from the group consisting of aliphatic polyhydric alcohols, alkylamines, alkylene polyamines, cyclic amines, amides and polycarboxylic acids, said compounds being characterized by having heteric polymeric chains of oxypropylene and oxyethylene groups attached at one of their ends to said nucleus of the reactive hydrogen compound at the sites of its reactive hydrogen atoms and by having chains of oxyethylene groups attached to the other ends of said heteric chains, said heteric polyoxypropylene-polyoxyethylene chains having from 5–40 weight percent of oxyethylene groups, based on the weight of said heteric chains, and having an average molecular weight of at least about 1000 and up to about 25,000 and the oxyethylene groups in said oxyethylene chains being sufficient in weight so as to constitute from about 20–80 weight percent of the mixture of surface active compounds.

10. A surface active mixture of conjugated polyoxyalkylene compounds according to claim 9 wherein said oxyethylene chains are sufficient in weight so as to constitute from about 30–70 weight percent of the surface active compounds.

References Cited in the file of this patent

UNITED STATES PATENTS

| | | |
|---|---|---|
| 2,425,845 | Toussaint et al. | Aug. 19, 1947 |
| 2,674,619 | Lundsted | Apr. 6, 1954 |
| 2,754,271 | Kirkpatrick | July 10, 1956 |
| 2,881,204 | Kirkpatrick | Apr. 7, 1959 |

UNITED STATES PATENT OFFICE
CERTIFICATE OF CORRECTION

Patent No. 3,022,335                        February 20, 1962

Lester G. Lundsted

It is hereby certified that error appears in the above numbered patent requiring correction and that the said Letters Patent should read as corrected below.

Column 3, line 16, for "hydrophobiv" read -- hydrophobic --; column 4, line 9, for "oxethylation" read -- oxyethylation --; lines 60 and 61, for "Nierderl and Nierderl," read -- Niederl and Niederl, --; columns 9 and 10, Table I, column 7, line 14 thereof, for "33.9" read -- 33.8 --; same Table I, column 6, line 24 thereof, for "388" read -- 888 --; same Table I, column 4, lines 40, 43, 46, 49 and 52 thereof, for "RCH", each occurrence, read -- RHC --; same Table I, column 10, line 52 thereof, for "90/00" read -- 90/10 --; same Table I, column 12, line 3 from the bottom of the column thereof, for "4 8." read -- 4.8 --; columns 13 and 14, Table V, column 3, line 17 thereof, for "3,060" read -- 3,600 --; column 14, line 14, for "inventon" read -- invention --.

Signed and sealed this 11th day of September 1962.

(SEAL)
Attest:
ERNEST W. SWIDER
Attesting Officer

DAVID L. LADD
Commissioner of Patents